Figure 1:
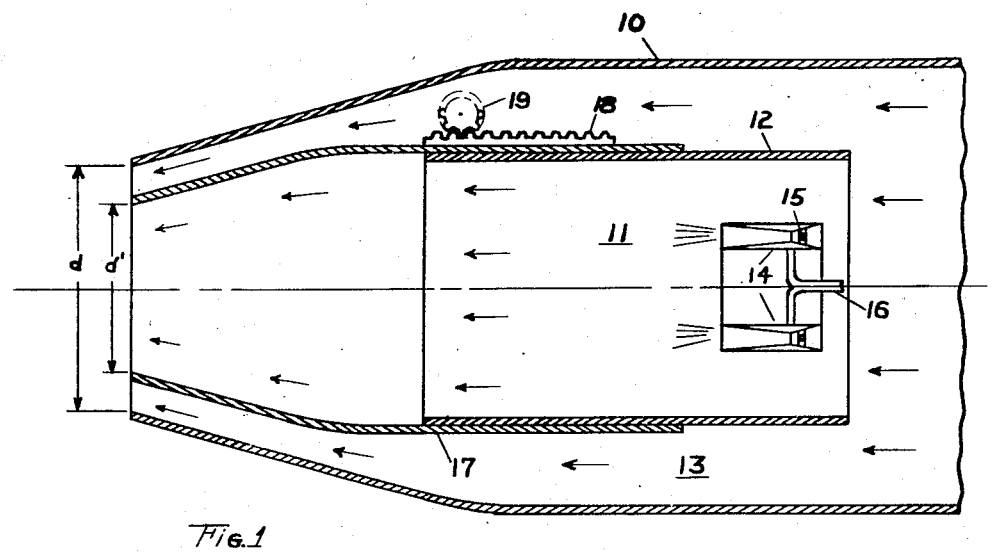

Sept. 24, 1946.  A. SHERMAN  2,408,099

VARIABLE-AREA NOZZLE FOR JET-PROPELLED AIRCRAFT

Filed April 7, 1943

INVENTOR
ALBERT SHERMAN
BY
ATTORNEY

Patented Sept. 24, 1946

2,408,099

UNITED STATES PATENT OFFICE 2,408,099

VARIABLE-AREA NOZZLE FOR JET-PROPELLED AIRCRAFT

Albert Sherman, Hampton, Va.

Application April 7, 1943, Serial No. 482,221

2 Claims. (Cl. 60—35.6)

(Granted under the act of March 3, 1883, as amended April 30, 1928; 370 O. G. 757)

This invention relates to the propulsion of aircraft by means of one or more blasts of gases delivered at high velocity from one or more nozzles, commonly known as jet propulsion, and has specific reference to an improved construction for the exhaust nozzle.

In one type of jet propulsion system to which my invention may be applied, air is taken into a duct at free stream total pressure and passed through a compressor, working through a small pressure rise and driven by a suitable engine. The air is then expanded in a diffuser to convert as much of the dynamic pressure into static pressure as feasible. In this high pressure region, the waste heat and momentum of the engine exhaust gases are added. The resulting low density gas escapes to the rear through a nozzle suitable for converting its excess pressure into dynamic pressure.

Ordinarily for cruising conditions, it will not be necessary that additional fuel be burned in the high pressure region, only the thrust developed by the ducted engine and compressor being required.

However, under conditions requiring large values of thrust, such as in take-off, climb, and high speeds, additional fuel may be burned in the high pressure region. If the discharge area of the exhaust nozzle is fixed, the mass flow in the jet decreases as the heat supply increases, the pressure drop out of the nozzle being constant, or the pressure drop required for constant mass flow increases as the fuel burned increases. If the jet is actuated by a low pressure blower, burning fuel in the jet can easily stall the blower at take-off, and, at higher airspeeds, will reduce the blower R. P. M., the mass flow and the power of the jet.

It is, therefore, of major importance that such jet propulsion systems be provided with means for varying the area of the exhaust nozzle.

It is therefore the principal object of this invention to provide an adjustable nozzle which is simple in construction, effective, and efficient. The outlet area of the nozzle may be adjusted to the proper size for operating conditions when no extra fuel is burned in the high pressure region such as during cruising as well as for conditions of operation when additional fuel is burned in the high pressure region such as is required during take-off, climb and high speed when additional thrust is desired.

Other objects will become apparent from the following detailed description and from the drawing which illustrates a preferred embodiment of the invention.

Figure 2:
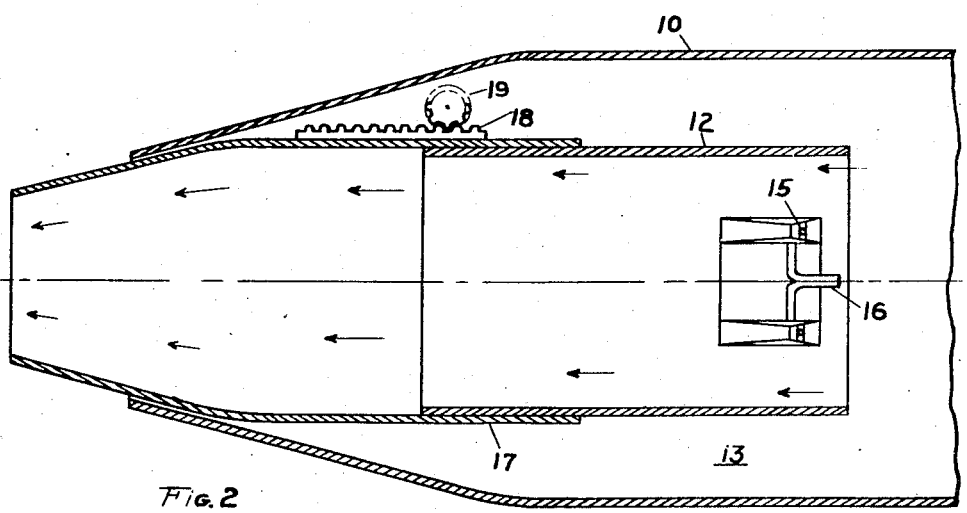

In the drawing:

Fig. 1 is a longitudinal vertical section of the rear portion of an aircraft provided with a system of jet propulsion illustrating the preferred embodiment of my invention under operating conditions when additional fuel is burned in the high pressure region; and Fig. 2 is a similar view showing the position of the parts for operation without the burning of fuel in the high pressure region.

Referring now to the drawing, 10 is an outer shell, suitably reinforced to carry any design loads and is the rear portion of the fuselage of the jet propelled body. A combustion chamber 11 is provided within a cylinder 12 which can be constructed of a relatively lightweight material. Cylinder 12 is spaced from the outer shell 10 so as to leave a duct 13 through which unburned air from the compressor (not shown) may be passed.

The function of the combustion chamber 11 is to raise the temperature of the compressed air advancing from the compressor, which may be accomplished by burning any suitable fuel therein. By increasing the air temperature, the equivalent of an additional drive or compression is obtained, the pressure of the air however, remaining the same and the outlet velocity of the gas being increased. Thus the interposition of the combustion chamber 11 between the compressor and the exhaust nozzle is practically equivalent to the interposition of a number of extra compressors, but with an advantage over the compressors in that the increase in gas velocity is obtained by absorption of thermal energy.

Any suitable burner may be utilized in the chamber 11. For purposes of illustration, a spray burner 14 having a converging-diverging conduit may be utilized, the contracted or aspirating section being fitted with small feed holes 15. The liquid fuel from a supply pipe 16 is thus sucked in, carried along and sprayed in the diverging conduit, and then combines with the gaseous mass surrounding the burner. In starting, electric ignition may be utilized.

The combustion chamber 11 is followed by the exhaust nozzle, the free area of which is made adjustable in accordance with my invention. The rear end of the outer shell 10 which is tapered, terminates in an opening having a diameter $d$, and adapted to slide within this opening there is provided an adjustable shell 17 having an opening of diameter $d'$ which overlaps the combustion cylinder 12. The shell 17 is adapted to be moved longitudinally and this may be accomplished by providing one or more rack gears 18 secured to the outer surface of the shell 17 which meshes with a pinion gear 19, rotation of the latter being controlled by the pilot.

Thus by moving the shell 17 fore and aft, the area of the exhaust nozzle may be adjusted between a design maximum (shown in Fig. 1) and a design minimum (shown in Fig. 2).

The dimensions of the variable exhaust nozzle to accommodate a desired range of operation can be estimated as follows: It will be assumed, for severity, that the mass flow and the pressure drop out of the combined nozzle are to be held constant for the two limiting conditions of operation which are (1) no burning in the combustion chamber 11, and (2) a maximum rate of burning therein.

Then $$\frac{Sa}{Sv.\,n.} = \frac{1 - \left(\frac{To}{Tv.\,n.}\right)^{\frac{1}{2}}}{\left(\frac{To}{Ta}\right)^{\frac{1}{2}}}$$

where $Sa$ or $$\pi\left(\frac{d}{2}\right)^2 - \pi\left(\frac{d'}{2}\right)^2$$

is the cross-sectional area of the annulus between the end of the shell 17 and the end of the outer shell 10 and $Sv.\,n.$ or $$\pi\left(\frac{d'}{2}\right)^2$$

is the cross-sectional area at the end of shell 17 (for the condition of the burning of fuel at the maximum rate as in Fig. 1); $Ta$ and $Tv.\,n.$ are the respective estimated average absolute temperatures for the same condition; and $To$ is the absolute temperature for no burning.

In conclusion, I wish it to be understood that the foregoing description and drawing are but representative only of one embodiment of the invention and that modifications will occur to those skilled in the art without departing from the spirit and scope of the invention as defined in the appended claims.

The invention described herein may be manufactured and used by or for the Government of the United States of America for governmental purposes without the payment of any royalties thereon or therefor.

Having thus fully described my invention, I claim:

1. A jet propulsion unit comprising, an outer cylinder-like shell for admitting and directing the flow of gaseous fluid therethrough, the exhaust end of said shell being tapered, a cylindrical shell forming a combustion chamber disposed within said outer shell and arranged concentrically therewith, said combustion chamber being open at both ends, an inner shell having a cylindrical portion and a tapered portion, said cylindrical portion being fitted upon the exhaust end of said combustion chamber shell with said tapered portion extending rearwardly for cooperation with the tapered portion of said outer shell to thereby constitute a variable area exhaust nozzle, and means for adjusting said inner shell axially to thereby vary the discharge area of said nozzle.

2. A jet propulsion unit comprising, an outer cylinder-like shell for admitting and directing the flow of gaseous fluid therethrough, the exhaust end of said shell being tapered, a cylindrical shell forming a combustion chamber disposed within said outer shell and arranged concentrially therewith, said combustion chamber being open at both ends, an inner shell having a cylindrical portion the outer diameter of which exceeds the diameter of the exhaust opening of said outer shell and a tapered portion, said cylindrical portion being fitted on said combustion chamber shell with the tapered portion extending rearwardly for cooperation with the tapered portion on the outer shell to thereby constitute a variable area nozzle, and means for adjusting said inner shell axially of said combustion chamber whereby the area of said nozzle may be varied between a maximum in which the nozzle area is substantially equal to the area of the opening at the exhaust end of said outer shell and a minimum in which the nozzle area is substantially equal to the area of the opening at the exhaust end of said inner shell.

ALBERT SHERMAN.